Dec. 31, 1940.  L. W. GOODELL  2,226,765

PACK OF BUSINESS FORMS AND METHOD OF MAKING THE SAME

Filed Aug. 21, 1940

Inventor:
Leslie W. Goodell
By Wallace and Cannon
Attorneys

Patented Dec. 31, 1940

2,226,765

UNITED STATES PATENT OFFICE 2,226,765

PACK OF BUSINESS FORMS AND METHOD OF MAKING THE SAME

Leslie W. Goodell, Dowagiac, Mich.

Application August 21, 1940, Serial No. 353,437

7 Claims. (Cl. 281—26)

This invention relates to a pack of business forms such, for example, as tax forms, factory production record forms, public utility billing forms, sales record forms, invoice forms, and the like which are arranged in a pack consisting of a plurality of groups or sets and each group or set consisting of a plurality of individual sheets bearing printed matter. Thus, for example, in making out tax bills in many municipalities it is customary to print a plurality of forms for each tax payer, one of which is given to the tax payer and the others of which are retained by the municipal, state or other governmental agency for accounting or other purposes. In many municipalities it is customary to print the constant or unchanging matter upon these tax forms and later to fill in the changing matter, such as the customer's name and address, the amount of the tax, etc., by hand.

At the present time it is customary in making many of such tax and other business forms for the printer thereof manually to arrange and bind these tax or other business forms, having the permanent or unchanging matter printed thereon, in a pack, each pack consisting of a plurality of superimposed groups or sets of these forms and each group or set consisting of a plurality of printed tax or like business forms which relate to a particular tax payer or, in the case of public utility billing forms or business forms, to a customer, or, in the case of factory production records, invoices, and the like, to a particular business transaction or operation. In so doing it is customary for the printer to bind all of the forms in each group or set together along one marginal edge thereof, by means of an adhesive, and then to arrange a plurality of these groups or sets, one upon the other, in a pack, whereupon all of the sheets in the thus assembled pack of these business forms are adhesively secured together along one marginal edge thereof so that each of the several sets or groups of sheets thus assembled into the pack may be separated or cut from the pack as a unit in order to enable the changing matter to be manually written or printed thereon.

It has been found, however, that the labor involved in assembling and binding a pack of business forms, in the manner briefly described above, is very considerable and that automatic machinery available for so doing is very expensive.

It has likewise been found that it is a difficult and laborious operation to sever the sets or groups of sheets from a pack of business forms thus assembled since this necessitates manually locating the top and bottom sheets of adjacent sets and the use of a very sharp knife to sever the sets at the edge along which they are glued together since unless a very sharp knife is used for this purpose the knife is apt to tear the padding glue or like adhesive off from the glued edge of the pack of business forms.

Accordingly, an object of the present invention is to provide a new and improved pack of business forms and method of making the same and in the practice of which a pack of business forms embodying any desired number of groups or sets of such business forms may be readily made so that when the operation of making the pack is completed the several groups or sets of sheets embodied in the pack will be separate from each other and ready for use by the customer or purchaser thereof, thereby not only minimizing the time and labor involved in making and assembling the pack of business forms but eliminating the time and labor heretofore required in separating the various groups or sets of sheets from the assembled pack.

Another object of the present invention is to provide a new and improved pack of business forms which is relatively less expensive to manufacture, from the standpoint of time and labor involved, than any of the packs of business forms of the same general type heretofore made.

Another object of the present invention is to provide a new and improved method of making a pack of business forms of the general type or character herein referred to.

Another object of the present invention is to provide a new and improved group or set of business forms, as an element or component part of the new pack of said business forms, and a new and improved method of making said set or group of business forms.

Other and further objects of the present invention will be apparent from the following description and claims and are illustrated in the accompanying drawing which, by way of illustration, shows a preferred embodiment of the invention and the principle thereof and what I now consider to be the best mode in which I have contemplated applying that principle. Other embodiments of the invention embodying the same or equivalent principles may be used and structural changes may be made as desired by those skilled in the art without departing from the present invention and the purview of the appended claims.

Figure 4:
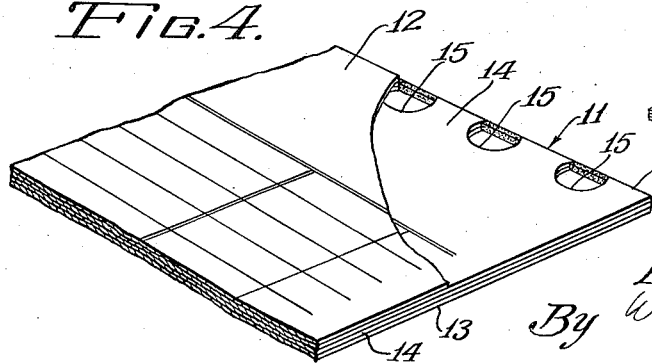
Figure 5:
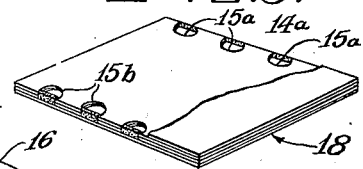

Fig. 4 is a perspective view of one of the groups or sets of sheets which forms a component part or element of the new pack of business forms, a portion of the top or cover sheet in said group or set being broken away to show the construction of the inner or filler sheets; and Fig. 5 is a perspective view similar to Fig. 4 but illustrating a slightly modified form of construction of the new pack of business forms.

A preferred embodiment of the present invention is illustrated in Figs. 1 to 4 of the drawing and comprises a plurality of groups or sets of business forms which may be paper sheets or sheets of like material. Each of such groups or sets 11 includes a top sheet 12, a bottom sheet 13 and a plurality of inner or filler sheets 14 and each of these inner or filler sheets 14 includes a marginal edge portion which has a row of indentations 15 punched or otherwise formed therein.

In assembling each group or set of business forms 11 the inner or filler sheets 14 are arranged between the top and bottom sheets 12 and 13, respectively, with the indentations 15 in the inner or filler sheets 14 in registration with each other.

Figure 1:
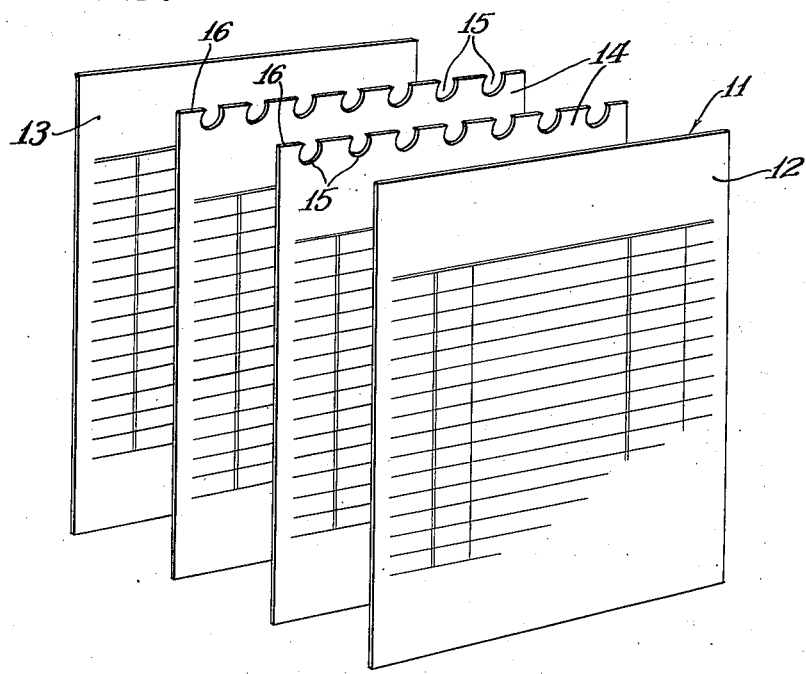
Fig. 1 is a perspective view showing separately the top and bottom and filler sheets which when assembled constitute one of the groups or sets of printed sheets which are embodied in the new pack of business forms.
Figure 2:
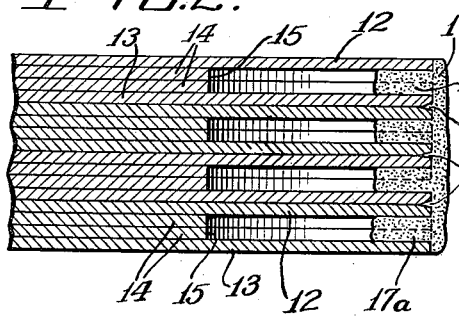
Fig. 2 is an enlarged fragmentary vertical sectional view illustrating the new pack of business forms as it appears after the gluing operation and before the trimming operation.
Figure 3:
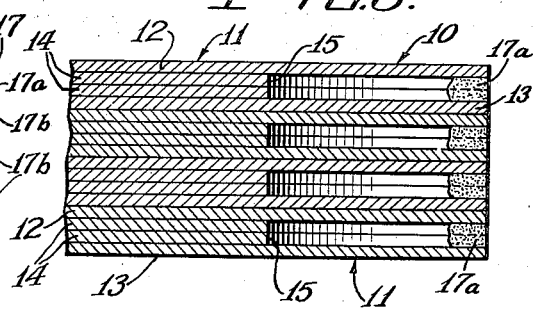
Fig. 3 is a fragmentary vertical sectional view, similar to Fig. 2, but illustrating the new pack of business forms as it appears after the gluing and trimming operations and in its final or assembled form.

The assembled stack of sheets is then turned into a vertical position and a suitable adhesive or glue 17, such as is known in the trade as "padding glue," is then spread, in any suitable manner, as by means of a brush, along the upper marginal edge of the assembled pack of top and bottom sheets 12 and 13 and filler sheets 14, that is, along that edge of said pack of forms or sheets which is adjacent to the recesses or indentations 15 which are formed in the inner or filler sheets 14, whereupon said adhesive or glue flows downwardly and penetrates into the recesses or indentations 15 in the inner or filler sheets 14, as is indicated at 17a in Figs. 2 and 3, thereby firmly securing the inner or filler sheets 14 together and also firmly securing the top and bottom or cover sheets 12 and 13, respectively, of each group or set of sheets to the inner or filler sheets 14 which are included in said set or group.

It will also be noted, in this connection, that when the adhesive 17 is applied to the upper marginal edge of the assembled pack or stack of business forms, as explained above, some of the adhesive, as indicated at 17b, runs down or penetrates in between the top sheet 12 of one set or group (of sheets) 11 and the bottom sheet of the next adjacent group or set of sheets arranged thereabove.

It will be noted, however, that the amount or quantity of the adhesive (17b) which runs or flows in between the top sheet 12 of one group or set 11 and the bottom sheet 13 of the next adjacent set 11 thereabove is relatively very small compared to the amount or quantity of said adhesive, indicated at 17a, which runs into the indentations or recesses 15, for a reason which will be explained presently.

It will also be noted as shown in the drawing, Figs. 2 and 3, that the adhesive material 17a penetrates only a relatively short distance into each of the recesses or indentations 15 in the inner or filler sheets 14 so that only a relatively small portion of the entire area of each indentation or recess 15 is filled thereby, thus facilitating separation of the top and bottom sheets 12 and 13 of each group or set 11 from the inner or filler sheets 14 therein, and also facilitating the separation of the inner or filler sheets 14 from each other.

After the adhesive has been applied to the thus assembled pack of sheets 10, and allowed to dry, a small strip, preferably from about 1/16" to 1/8" in width, is then trimmed off from the glued marginal edge of the pack of sheets, by means of a suitable paper knife, and the small strip thus removed carries with it substantially all of the adhesive (17) (Fig. 2) which adheres to the strip thus trimmed from the glued marginal edge of the pack 10, including the adhesive 17b which has penetrated in between the several adjacent top and bottom sheets 12 and 13 of the pack, thus leaving the assembled and completed pack of sheets in the form in which it is illustrated in Fig. 3.

When the new pack of business forms has been thus completed the various groups or sets 11 are separate and independent of each other due to the fact that the glue 17b has been removed from between the top and bottom sheets 12 and 13, respectively, in the pack during the trimming operation, as explained above, and hence are ready for packing and delivery to the customer or purchaser thereof.

A slightly modified form of construction is shown in Fig. 5, wherein it is generally indicated at 18, and this form of the new pack of business forms is substantially similar to that shown in Figs. 1 to 4, inclusive, except that in addition to indentations or recesses 15a which are formed in the filler sheets 14a, and which correspond to the indentations 15 in the filler sheets 14, another row of indentations 15b is formed in one of the other marginal edge portions of the filler sheets 14 which is parallel to the marginal edge in which the indentations 15 are formed and adhesive is also applied to this edge to fill the recesses 15b and the said edge is then trimmed in the manner hereinbefore described in reference to the form of construction shown in Figs. 1 to 4, inclusive.

It will be noted, in this connection, with the form of construction shown in Fig. 5, that the pack of business forms 18 therein shown may be cut, after the trimming operation, into two or more parts, each of which will have a marginal edge portion provided with glue-filled indentations such as 15a or 15b, and for some uses this type of construction shown in Fig. 5 is advantageous.

It will thus be seen that the present invention eliminates the necessity, in the prior art methods of making a pack of business forms of the same general type, for manually and separately gluing the several inner or filler sheets and the top and bottom or cover sheets of each set or group together, as was the customary practice in the prior art, and also eliminates the necessity for severing each group or set of sheets from the assembled pack as was necessary in the prior art practice, since in the practice of the present method the several groups or sets of sheets are ready for use after the last step in the method, namely, the trimming operation, has been completed. Hence it will be seen that the present invention and the practice of the present method represent a time and labor saving method of making a pack (or set) of business forms of the character hereinbefore referred to.

While I have illustrated and described preferred forms of construction and a preferred method for carrying my invention into effect, these are capable of variation and modification, without departing from the spirit of the invention. I, therefore, do not wish to be limited to the precise details of the construction and method set forth, but desire to avail myself of such variations and modifications as come within the scope of the appended claims.

I claim:

1. The method of making a pack of business forms of the type which includes a plurality of groups of paper sheets arranged one upon the other and in which each of said groups of paper sheets includes a top sheet and a bottom sheet and a plurality of filler sheets arranged between said top and bottom sheets, which comprises forming an indentation in a marginal edge portion of each of said filler sheets, arranging the said filler sheets one upon the other between the said top and bottom sheets with the said indentations therein in registration with each other, arranging a plurality of said groups of paper sheets thus formed one upon the other, then applying adhesive material along the said marginal edge of the said pack of sheets thus assembled so that the said adhesive material thus applied flows into said indentations and adhesively secures the said filler sheets in each of said groups together and the adjacent top and bottom sheets thereto, and then severing a relatively narrow strip and attached adhesive material from the said marginal edge portion of each of said sheets in the said pack of the same after the said adhesive material has been applied thereto and allowed to dry.

2. The method of making a pack of business forms of the type which includes a plurality of groups of paper sheets arranged one upon the other and in which each of said groups of paper sheets includes a top sheet and a bottom sheet and a plurality of filler sheets arranged between said top and bottom sheets, which comprises forming an indentation in a marginal edge portion of each of said filler sheets, arranging the said filler sheets one upon the other between the said top and bottom sheets with the said indentations therein in registration with each other, arranging a plurality of said groups of paper sheets thus formed one upon the other, and then applying adhesive material along the said marginal edge of the said pack of sheets thus assembled so that the said adhesive material thus applied flows into said indentations and adhesively secures the said filler sheets in each of said groups together and the adjacent top and bottom sheets thereto, and so that a relatively small quantity of the said adhesive material, substantially less than the quantity of the same which flows into said indentations, flows between the top sheet of one of said groups and the bottom sheet of the next adjacent one of said groups, and then severing a relatively narrow strip and attached adhesive material from the said marginal edge portion of each of said sheets in the said pack of the same after the said adhesive material has been applied thereto and allowed to dry so as to remove with the said strip thus severed substantially all of the adhesive material which has penetrated between the top sheet of each of said groups of paper sheets and the bottom sheet of the next adjacent one of said groups, while allowing the said adhesive material to remain in said indentations.

3. The method defined in claim 2 in which the said adhesive material which flows into each of said indentations fills only a relatively small portion of the entire area of each of said indentations.

4. The method defined in claim 2 in which the said adhesive material which flows into each of said indentations fills only a relatively small portion of the entire area of each of said indentations and in which that portion of each of said indentations which is filled by the said adhesive material lies adjacent to, and opens out onto, the said marginal edge of the sheet in which the said indentation is formed.

5. As a new article of manufacture, an integral pack of paper sheets including a top sheet and a bottom sheet and a plurality of inner sheets arranged one upon the other between said top and bottom sheets, each of said inner sheets including a marginal edge portion having a horizontally extending row of indentations formed therein, said indentations in each of said inner sheets extending inwardly from and opening out onto the said marginal edge of the said inner sheet in which they are formed and corresponding indentations in said inner sheets being disposed in vertical registration with each other to form vertically extending rows of said indentations, said top sheet and said bottom sheet each including an uninterrupted marginal edge portion extending over the said indentations in said inner sheets, all of the said indentations in each of the said vertically extending rows of the same being of substantially the same size and shape, and a solid, continuous mass of adhesive material in each of said vertically extending rows of said indentations only and thereby not increasing the thickness of the pack of sheets, and the outer edges of each of said sheets intermediate the said indentations being free of any adhesive, and each of said masses of adhesive material extending around at least a substantial portion of the peripheral edge of each indentation in the said vertically extending row of indentations in which the said mass of adhesive material is disposed so as to bind all of the said inner sheets in said pack together and the said top and bottom sheets thereto, whereby to form an integral pack of paper sheets which may be readily separated from each other by tearing the same along the said marginal edge thereof.

6. A pack of business forms comprising a group of sheets stacked one upon the other, said group of sheets including a top sheet and a bottom sheet and a plurality of filler sheets arranged between said top and bottom sheets, each of said filler sheets including a marginal edge portion having a cut-out portion therein providing an indentation extending inwardly from and opening out onto the said marginal edge of said filler sheet, and adhesive material in said indentations only and thereby not increasing the thickness of the pack of sheets, said top sheet and said bottom sheet each including an uninterrupted marginal edge portion projecting over the said cut-out portions in said filler sheets, and the outer edges of each of said sheets intermediate the said indentations being free of any adhesive, said adhesive material securing all of the said filler sheets in said group together and also securing the said top and bottom sheets in said group to the said filler sheets in said group.

7. A set of business forms comprising a top sheet and a bottom sheet and a plurality of sheets between said top and bottom sheets, each of said second-named sheets including a marginal edge portion having a plurality of spaced indentations therein extending inwardly from and opening out onto the said marginal edge of the said sheet in which said indentations are formed, and adhesive material in said indentations only and thereby not increasing the thickness of the pack of sheets, said top sheet and said bottom sheet each including an uninterrupted marginal edge portion projecting over the said indentations in said second-named sheets, and the outer edges of each of said sheets intermediate the said indentations being free of any adhesive, said adhesive material securing all of said second-named sheets together and said adhesive material also securing the said top and bottom sheets to the said second-named sheets.

LESLIE W. GOODELL.